United States Patent Office 2,928,680
Patented Mar. 15, 1960

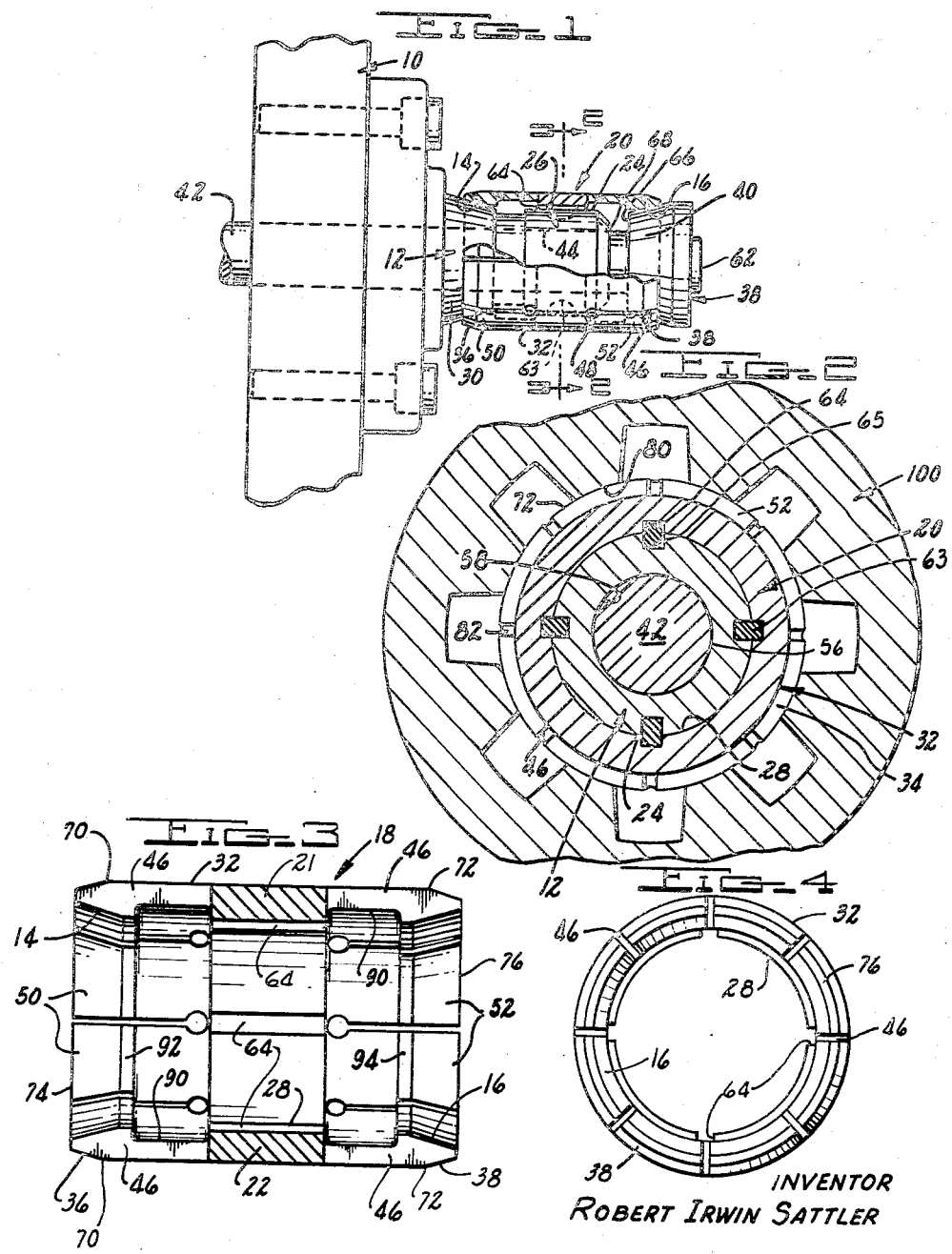

2,928,680

COLLET CHUCK CONSTRUCTION

Robert Irwin Sattler, St. Clair Shores, Mich., assignor to La Salle Tool, Inc., Detroit, Mich., a corporation of Michigan Application May 15, 1958, Serial No. 735,498

7 Claims. (Cl. 279—2)

The present invention relates to new and useful improvements in collet chuck construction and more particularly to a work-holding collet chuck construction having expansible jaws at both ends thereof for accurately positioning a partially completed work piece in a previously machined bore.

In the manufacture of various precision machine parts, it is very often necessary to use one machine for a boring and surface finishing operation and then perform a second operation in another machine, using the previously mentioned bore or finish surface as a locating point. The accuracy of the secondary operations and the ultimate quality of the finished part is dependent upon the efficiency of the clamping means used during these secondary operations.

For the most part, collet chuck devices presently in use are used to clamp the outside diameter of small, high-production parts. When this type collet is used, bar stock is fed through the inside diameter of the collet chuck automatically. The stock is manually clamped or unclamped in the collet by rotation of a draw bar mounted in the head stock of a conventional lathe.

Another collet chuck construction in use today is the expanding mandrel type. In this construction, an expansible sleeve member with a tapered inside diameter is positioned over a tapered shank mandrel supported in a lathe at both ends. The part being machined is assembled over one end of the mandrel in such a manner as to have the expansible tapered sleeve clamp the inner bore of the work piece. This clamping means is necessarily very costly, as well as slow, since the mandrel must be disconnected from the head or tail stock each time a new work piece is inserted.

It is therefore an object of the present invention to provide an expansible collet chuck construction which when used will accurately clamp the inside diameter of a work piece in a rotating machine.

Another object of this invention is the provision of a resilient collet chuck construction which will be positive in action, simple in construction, and capable of clamping the inside diameter of successive parts accurately and with a minimum of labor.

Another object of the present invention is the provision of a resilient collet chuck construction with an expansible sleeve member, wherein means are provided to pilot and expand the resilient expansible sleeve so as to engage and securely clamp the inside diameter of a work piece.

Another object of the present invention is the provision of a self-centering type collet chuck construction which may be adapted for use on any rotating metal working machine.

Still another object of this invention is the provision of a piloted resilient expansible collet chuck which expands uniformly at both ends to engage a work piece.

The foregoing and related objects can be accomplished by the provision of an expansible collet chuck construction for use with a rotating machine, wherein a cylindrical sleeve of resilient material is provided; a plurality of equally spaced slots are located in each end thereof to form jaws; conical seats on the inner diameter of both ends of said resilient cylindrical sleeve; a pilot pin affixed to the axis of said rotating machine; a bore in said pilot pin concentric with the outside diameter of said pilot pin; a first conical section on one end of said pilot pin; a second pin in slideable engagement with the bore of said first pilot pin; an enlarged end portion on said second pin; a second conical portion on the enlarged end of said second pin; and means for moving said first and said second conical portions into engagement with said conical seats to cause the jaws of said slotted cylindrical collet chuck sleeve to expand and engage the inside diameter of a partially machined work piece.

Other objects of this invention will appear in the following description and appended claims, reference being had to the accompanying drawings forming a part of this specification wherein like reference characters designate corresponding parts in the several views.

In the drawings:

Fig. 1 illustrates an elevational view, partially broken away, of an expansible collet chuck construction embodying the present invention.

Fig. 2 is a cross-sectional view taken on lines 2—2 of Fig. 1 illustrating the collet chuck in engagement with a work piece.

Fig. 3 is a cross-sectional view of an expansible collet chuck construction with the expanding means removed.

Fig. 4 is an end elevational view of Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, Fig. 1 illustrates an elevational view, partially broken away of expansible collet construction 20 embodying the present invention. A rotating machine 10 has affixed thereto a pilot pin assembly 12 for supporting the expansible, cylindrical collet chuck 20. Referring to Fig. 3 of the drawings which illustrate a blank collet chuck construction 18 without the actuating means illustrated in Fig. 1, it is noted that the collet chuck construction is generally cylindrical in shape. The body portion 22 of the cylindrical collet chuck construction 18 is of substantially uniform wall thickness. The outside diameter 32 of the body portion 22 is parallel with the inside diameter 28 of the sleeve and square with both ends 74 and 76. The end surfaces of the collet sleeve 18 have chamfered portions 36 and 38 thereon to permit easy and rapid entry of a work piece. At the intersection of the chamfered surface portion 36 with the outside diameter 32 of the body portion 22, is a work piece contact point 70. On the other end of the cylindrical collet sleeve 18 is a second work piece contact point 72, which lies at the intersection of the chamfered surface portion 38 and the outside diameter of the body portion 32.

The inside diameter of the cylindrical body 22 of sleeve 18 has a precision ground bore 28 located therein. At both ends of sleeve 18 and on the inside diameter thereof, are located tapered cam surfaces 14 and 16. Cam surface 14 is located on the left end of the cylindrical sleeve 18 and cam surface 16 is located on the right end of the sleeve. A plurality of narrow longitudinal slots 46 are located on both ends of the sleeve and can be best seen in Fig. 4. Fig. 4 illustrates an end view of the construction shown in Fig. 3.

Four equally spaced keyways 64 are cut on the inside diameter 28 of the collet chuck 20. These keyways 64 are positioned on the central land area 21 of the body 22. Similarly, four equally spaced key slots 65 are located in the outside diameter 24 of the nose portion 26 of pilot pin assembly 12. Keys 63 located in the keyways 64 and key slots 65 then act to drive said collet construction during actual usage.

The longitudinal slots 46 are cut to a depth of approximately one third the total length of the cylindrical sleeve 18. The slots which are cut in both ends, are cut to exactly the same depth so as to provide a uniform distribution of forces throughout the cylindrical sleeve. Since the slots 46 are located in both ends of the sleeve, a solid body portion of approximately one third the total length of the sleeve is centrally located. Slots 46 terminate in a round machine opening which is tangent to the central body land portion 22 and enters an undercut portion 90 which extends in both directions under said slotted portions. A non-bearing surface 92 is located between the undercut surface 90 and the tapered cam surface 14 on one end and a similar non-bearing surface 94 is located between the undercut surface 90 and the tapered cam portion 16 on the opposite end.

The first tapered cam section 14 is located on the inner diameter of the jaw portion 50 at one end of the cylindrical collet chuck 20. Cam section 14 is seated against a fixed conical seat 30 which is integral with the inner pilot pin assembly 12. The second tapered cam section is located on the inside diameter of the jaw portion 52 on the opposite end of the cylindrical collet chuck 20 and is seated against a movable member 38. The movable member 38 has a conical seat 40 on the enlarged end thereof and a stem 42 extending through a central bore 44 in the pilot pin assembly 12. The central bore 44 is concentric with the outside diameter of the pilot pin assembly 12.

The expansible cylindrical collet chuck 20 has longitudinal slots 46 in both ends thereof. Each of the slots 46 terminate in a round machine opening 48 adjacent the central body portion. The central body portion 22 of the collet chuck 20 is piloted on the outside diameter 24 of the nose portion 26 on the pilot pin assembly 12.

Actuating means (not shown) are provided for movement of the stem member 42 which is piloted in the bore 44. Movement of the stem 42 is made in both directions, one locking the part in position, the other releasing said part. Movement of the stem 42 to the left causes conical seat 40 to move toward conical seat 30. This, right to left movement in turn causes cam faces 14 and 16 on the collet to engage the conical seats 30 and 40, so as to equally expand the jaw members 50 and 52 at both ends thereof to engage the inside diameter of a work piece at contact points 70 and 72.

The tightness of the clamp is determined by the amount of force exerted on stem 42 in a leftward direction. This clamping action of jaws 50 and 52 can also be accomplished by the exertion of a force on the flat right end surface 62 of the movable collet stem member 38. Should this method of clamping be used, the length of stem member 42 can be materially reduced. In either event, the clamping means above described provides only a limited amount of jaw expansion. The maximum amount of expansion without damage to the collet chuck 20 is accurately calculated and limited by the engagement of faces 68 on the nose portion 26 of the pilot pin assembly 12 and the face surface 66 of the movable stem member 38. When surfaces 66 and 68 engage each other, the jaw members 50 and 52 have then reached the maximum safe limit of expansion.

If the part being clamped has too large a bore and is not securely held when clamped, it will be necessary to change the cylindrical sleeve collet chuck 20 for the next larger collet size. Because of the simplicity of the present invention, a number of collets are made in the form of a collet tool kit, each set of collets being adapted for use on a particular pilot pin assembly. Each of the pilot pin assemblies is adapted for use with a number of collet sizes, thereby providing a predetermined range of sizes without necessity of changing the pilot pin each time a size variation within a predetermined range occurs.

The clamping action of the collet chuck construction 20 is illustrated in Fig. 2 of the drawings, wherein a splined work piece 100 is clamped in position. The stem 42 on the movable member 38 extends lengthwise of the cylindrical collect chuck 20. The outside diameter 56 of stem 42 is in slideable engagement with the concentric bore 44 and the pilot pin assembly 12. The outside diameter of the pilot pin assembly 12 engages the inside diameter 28 of the central body portion 22 of the cylindrical collet chuck 20. Expansion of the jaw members 50 and 52 act to self center the work piece and as a result a cavity is formed surrounding the outside diameter 32 of the central body 22. The contact surface 72 of jaw member 52 upon expansion, engages the inside diameter 80 of the splined work piece 100 on one end. The jaw member 50 engages the inside diameter of the work piece 100 at contact point 70, thereby providing a three point suspension of the work piece. Slots 46 in both ends of the collet 20 have a resilient rubber or plastic material 82 molded or vulcanized therebetween, to prevent entrance of metal chips or the like which would impair the accuracy of the tool during usage. The resilient material filling the slotted cavity will not extend either above or below the metal surface of the cylindrical collet chuck structure proper.

It will be readily apparent from the above description that the collect chuck construction provided is self centering and positive in action. It is simple, durable and efficient and capable of clamping a work piece with a minimum of time and labor.

Having thus described my invention, I claim:

1. In a self centering expansible collet chuck construction for use with a rotating metal working machine, the combination of an expansible cylindrical sleeve of resilient material; a cylindrical pilot pin assembly in keyed engagement with the inside diameter of said expansible sleeve for locating, driving and centering said expansible sleeve; means for expanding said sleeve so as to engage the inside diameter of a work piece.

2. In a self centering collet chuck construction for use with a rotating machine, the combination of an expansible cylindrical sleeve of resilient material; a plurality of aligned slots in each end thereof, separated by a land area; a cylindrical pilot pin in keyed engagement with the inside diameter of said land area; and means for expanding said expansible sleeve at both ends so as to engage the inside diameter of a work piece.

3. In a self centering expansible collet chuck construction for use with a rotating machine, the combination of an expansible cylindrical sleeve; a plurality of aligned slots in each end thereof separated by a centrally located land area; a resilient material bonded between the edges of said slots; a cylindrical pilot pin in keyed engagement with the inside diameter of said expansible cylindrical sleeve; means for expanding said expansible sleeve at both ends to engage the inside diameter of a work piece.

4. In a self centering collet chuck construction for use with a rotating machine, the combination of an expansible cylindrical sleeve of resilient material; a plurality of aligned longitudinal slots to form jaws in each end of said expansible cylindrical sleeve; tapered faces on the inside and outside diameter of both ends of said cylindrical sleeve; a cylindrical pilot pin assembly affixed to said rotating machine; a bore in said pilot pin, concentric with the outside diameter of said pin; a stem member in slideable engagement with said bore in said pilot pin assembly; a first conical seat on said pilot pin assembly; an enlarged end on said stem member; a second conical seat on the enlarged end of said stem; means for moving said second conical seat portion toward said first conical seat section to expand said expansible sleeve so as to engage the inside diameter of a work piece intermediate the ends of the collet.

5. In a self centering collet chuck construction for use with a rotating machine, the combination of a cylindrical sleeve of resilient material; a plurality of aligned narrow slots in each end of said cylindrical sleeve, to form jaws; tapered surfaces on the inside and outside diameter of each end; a pilot pin assembly affixed to said rotating machine; a bore in said pilot pin assembly; a first conical seat on one end of said pilot pin assembly; a stem member slideably mounted in said pilot pin assembly bore; a conical seat on one end of said stem member; means for moving said conical seats together to equally expand said jaw members at both ends so as to engage and clamp the inside diameter of a work piece intermediate the ends of the collet.

6. In a self centering expansible collet chuck construction for use with a rotating machine, the combination of an expansible cylindrical sleeve of resilient material; a plurality of slots in each end thereof; said slots cut to an equal depth of approximately one third the total length from each end to form jaws; tapered surfaces on the inside and outside diameter of each end; a resilient material bonded between the edge surfaces of said slots; said material having the same contour as the sleeve proper; a pilot pin assembly affixed to said rotating machine; the inside diameter of said expansible sleeve in keyed engagement with the outside diameter of said pilot pin assembly; a bore in said pilot pin assembly; a first conical seat on one end of said pilot pin assembly; a stem member having an enlarged end slideably mounted in engagement with the bore in said pilot pin; a conical seat on the enlarged end of said slideably mounted stem member; means for moving said conical seats together, to equally expand said jaw members at both ends, so as to engage and clamp the inside diameter of a work piece intermediate the ends of the collet.

7. In a self centering expansible collet chuck construction for use with a rotating machine, the combination of an expansible cylindrical sleeve of resilient material; a chamfer at both ends of said sleeve on the outside diameter thereof; tapered cam surfaces at both ends of said cylindrical sleeve on the inside diameter; a land area intermediate said tapered cam surfaces; an undercut area at both ends of said sleeve with a land area between; said land area centrally located in said sleeve and equal to approximately one third the total height of said sleeve; a plurality of equally spaced slots in each end of said cylindrical sleeve; said slots cut to a depth of approximately one third the total height of said cylindrical sleeve; said slots terminating in a round opening, tangentially the edge of said central land area, so as to equally distribute all of the forces throughout the collet body; a resilient material bonded between the edge surfaces of said slots, said material having the same contour as the sleeve proper; a pilot pin assembly affixed to said rotating machine; a precision bore in said pilot pin assembly, concentric with the outside diameter; a first conical seat on one end of said pilot pin assembly; a stem member slideably mounted in said concentric bore of said pilot pin assembly; a conical seat on said slideably mounted stem member; means for expansion, within predetermined limits, of said self centering cylindrical sleeve; said means, to cause said jaw members, to engage and clamp the inside diameter of a work piece intermediate the ends of the collet.

References Cited in the file of this patent

UNITED STATES PATENTS

| | | |
|---|---|---|
| 2,466,129 | Stoner | Apr. 5, 1949 |
| 2,732,213 | Drew | Jan. 24, 1956 |
| 2,789,825 | Drew | Apr. 23, 1957 |
| 2,817,532 | Hohwart et al. | Dec. 24, 1957 |
| 2,896,954 | Ernest | July 28, 1959 |

FOREIGN PATENTS

| | | |
|---|---|---|
| 482,766 | Great Britain | Apr. 5, 1938 |